UNITED STATES PATENT OFFICE.

CHARLES A. H. DE SAULLES, OF NEW YORK, N. Y.

PROCESS OF TREATING ZINC.

1,274,249.	Specification of Letters Patent.	Patented July 30, 1918.

No Drawing.	Application filed November 3, 1915.	Serial No. 59,353.

*To all whom it may concern:*

Be it known that I, CHARLES A. H. DE SAULLES, a citizen of the United States, residing at New York city, in the borough of Manhattan and State of New York, have invented a certain new and useful Improvement in Processes of Treating Zinc, of which the following is a specification.

My invention relates to improvements in processes of treating zinc.

It relates particularly to a process of treating zinc, which contains lead or other impurities.

The object of my invention is to provide a novel process of treating zinc, which carries lead or other impurities, by which large quantities of high grade zinc of uniform quality may be economically produced.

In carrying my invention into effect, zinc, as for example, ordinary spelter, is first refined by liquefaction, whereby a large amount of the lead and other impurities is separated by gravity from the zinc. This may be effected in an ordinary melting furnace, such as is commonly employed for such purpose.

The zinc is then volatilized, most of the lead being thus eliminated, following which the zinc is condensed to a liquid condition. The volatilization and condensation may be effected in a retort furnace of suitable type and discharging into condensers, the zinc being conducted in a molten condition from the first furnace, in which the liquefaction was effected, into the retorts of the retort furnace. The zinc, while still in the molten condition, is taken from the condensers and aggregated in one molten mass until a relatively large body has been amassed.

Preferably the molten body thus amassed is subjected to a stirring operation, whereby a uniform and homogeneous condition of the body is effected.

By retaining the zinc in a molten condition, from the time it leaves the melting furnace until it is deposited in the retort furnace, and from the time it is condensed to liquid form from the vapor until it has been deposited in the aggregating or collecting furnace, such as an ordinary reverberatory furnace, great economy in fuel is effected and a higher grade of zinc is obtained than is produced in the usual manner of treatment.

By aggregating and thoroughly mixing in a relatively large body the zinc produced by the steps just hereinbefore described, a high grade product is obtained, which is more uniform in its composition, than it is possible to obtain in the production of large quantities by the methods usually employed. Ordinarily, in refining zinc, it is charged in the retorts in a solid state, and requires to be melted in the retorts, thereby disturbing the temperaure conditions in the retort furnace which results in the production of zinc which is not uniform as to grade. By charging the retorts with molten zinc, as in my process, the temperature conditions of the retort furnace are not disturbed and much greater uniformity of the product is obtainable. Owing to the difficulty of subjecting the several retorts of the retort furnace to the same temperature conditions, which difficulty is greatly amplified when the zinc is charged in the retorts in solid state, the percentage of lead contained in the zinc in the different condensers varies, thereby varying the grades of zinc produced. Ordinarily the refined zinc is taken in small quantities by ladles from the condensers and cast in small slabs which vary greatly as to grade and uniformity. Some of the zinc will be of sufficiently high grade to be used for certain designated purposes, as in the making of brass for cartridge shells, while some of the zinc will contain too much lead to make it suitable for the purpose. Or the zinc taken separately from the condensers, while possibly sufficiently low in lead will not be uniform in composition, which lack of uniformity will render it undesirable for its manipulation with dies owing to the lack of like results with like manipulation.

By collecting or aggregating the product of the different condensers in molten state until a large quantity has been thus amassed, and thoroughly mixing the zinc thus aggregated, complete uniformity of the whole mass is obtained, thereby enabling the production of a large quantity of zinc or spelter which will be absolutely uniform as to its composition.

Modifications of my invention, within the scope of the appended claims, may be made without departing from the spirit of my invention.

What I claim is:—

1. The process of treating metallic zinc consisting in first melting zinc containing lead, and eliminating by gravity therefrom a large amount of the lead; then heating to volatilization the zinc thus treated, and thereby eliminating therefrom most of the lead which remains; then condensing to a molten condition the zinc thus volatilized; and then collecting the zinc thus condensed and retaining it in a molten condition until a relatively large body thereof has been amassed.

2. The process of treating metallic zinc consisting in first melting zinc containing lead, and eliminating by gravity therefrom a large amount of the lead; then heating to volatilization the zinc thus treated, and thereby eliminating therefrom most of the lead which remains; then condensing to a molten condition the zinc thus volatilized; then collecting the zinc thus condensed and retaining it in a molten condition until a relatively large body thereof has been amassed, and then stirring the melted body to effect a uniform and homogeneous condition thereof.

3. The process consisting in charging a retort with melted zinc containing lead; then volatilizing the zinc, and thereby eliminating therefrom most of the lead contained in the charge; then condensing to a molten condition the zinc thus volatilized; and then collecting the zinc produced by the foregoing steps and retaining it in a molten condition until a relatively large body thereof has been amassed.

4. The process consisting in charging a retort with melted zinc containing lead; then volatilizing the zinc, and thereby eliminating therefrom most of the lead contained in the charge; then condensing to a molten condition the zinc thus volatilized; then collecting the zinc produced by the foregoing steps and retaining it in a molten condition until a relatively large body thereof has been amassed, and then stirring the molten body to effect a uniform and homogeneous condition thereof.

5. The process of treating metallic zinc containing lead consisting in melting the zinc and thereby eliminating therefrom by gravity a large amount of lead; then transferring the zinc in a molten condition to a plurality of retorts wherein the melted zinc is volatilized and most of the lead which remains therein is eliminated; then condensing to a molten condition, the zinc which has been volatilized in the retorts; and then collecting the zinc while it is still in a molten condition and amassing it in one body.

6. The process of treating metallic zinc containing lead consisting in melting the zinc and thereby eliminating therefrom by gravity a large amount of the lead; then transferring the zinc in a molten condition to a plurality of retorts wherein the melted zinc is volatilized and most of the lead which remains therein is eliminated; then condensing to a molten condition, the zinc which has been volatilized in the retorts; then collecting the zinc while it is still in a molten condition and amassing it in one body, and then stirring the molten body to effect a uniform and homogeneous condition thereof.

7. The process consisting in collecting in one body, while still in a molten condition, the zinc condensed in a plurality of condensers.

8. The process consisting in collecting in one body, while still in a molten condition, the zinc condensed in a plurality of condensers, and stirring the molten body thus collected.

9. The process consisting in melting metallic zinc containing lead and eliminating therefrom by gravity a large amount of the lead, then eliminating from the zinc most of the lead retained therein by redistillation of the zinc.

In testimony whereof I have signed my name to this specification.

CHARLES A. H. DE SAULLES.